United States Patent [19]
Creatura et al.

[11] Patent Number: 5,929,136
[45] Date of Patent: Jul. 27, 1999

[54] COATED CARRIERS

[75] Inventors: John A. Creatura, Ontario; K. Derek Henderson, Rochester; Scott M. Silence, Fairport; Bernard A. Kelly, Ontario, all of N.Y.

[73] Assignee: Xerox Corporation, Stamford, Conn.

[21] Appl. No.: 08/876,099

[22] Filed: Jun. 13, 1997

[51] Int. Cl.⁶ ....................................... C08K 9/04
[52] U.S. Cl. ........................ 523/205; 524/413; 430/108
[58] Field of Search ........................... 523/205; 524/413; 430/108

[56] References Cited

U.S. PATENT DOCUMENTS

| 3,590,000 | 6/1971 | Palermiti et al. ...................... 262/62.1 |
| 4,233,387 | 11/1980 | Mammino et al. ...................... 430/137 |
| 4,810,611 | 3/1989 | Ziolo et al. ........................... 430/106.6 |
| 4,935,326 | 6/1990 | Creatura et al. ........................ 430/108 |
| 4,937,166 | 6/1990 | Creatura et al. ........................ 430/108 |
| 5,376,494 | 12/1994 | Mahabadi et al. ...................... 430/137 |
| 5,700,615 | 12/1997 | Silence et al. ........................ 430/106.6 |
| 5,744,275 | 4/1998 | Duggan et al. .......................... 430/180 |

*Primary Examiner*—Robert Dawson
*Assistant Examiner*—D. Aylward
*Attorney, Agent, or Firm*—E. O. Palazzo

[57] ABSTRACT

A composition comprised of a core and thereover a mixture of a first and second polymer, and wherein said first polymer contains a conductive component, and said second polymer contains copper iodide, and wherein the coating weight percent for said first and said second polymer is from about 5 to about 25.

21 Claims, No Drawings

COATED CARRIERS

PENDING APPLICATIONS AND PATENT

In U.S. Pat. No. 5,700,615, the disclosure of which is totally incorporated herein by reference, there are illustrated carrier particles with coatings containing copper iodide.

In copending application U.S. Ser. No. (08/876,100), filed concurrently herewith, the disclosure of which is totally incorporated herein by reference, there are illustrated carrier coating processes.

BACKGROUND OF THE INVENTION

This invention is generally directed to developer compositions, and more specifically, the present invention relates to developer compositions with conductive coated carrier particles which may be prepared by dry powder processes. In embodiments of the present invention, the carrier particles are comprised of a hard magnetic core, that is, a core which when exposed to a magnetic field acquires a magnetic moment which is retained by the core after the magnetic field is removed, and which core includes, for example, strontium ferrite, and the like, with a polymeric mixture coating thereover, and more specifically, a mixture of two polymers, and dispersed in one polymer conductive components, such as carbon black, and dispersed in the second polymer a copper iodide, especially cuprous iodide, thereby enabling carriers with excellent high conductivity ranges of from about $10^{-10}$ to about $10^{-7}$ ohm/cm, and a large tribo range of from about a minus (−) 30 to a plus 30 microcoulombs per gram. The carrier particles prepared in accordance with the processes of the present invention contain in one of the polymer carrier coatings cuprous iodide in certain important amounts and certain coating weights to enable in combination with the polymer/conductive coating a certain carrier conductivity range, and a wide carrier triboelectric range, and wherein the carriers generated can be selected for a number of different xerographic copies and printers wherein carriers with certain specific conductivity and certain tribo charge are required. The carrier particles of the present invention contain important amounts, or levels of polymer coating containing additives, such as cuprous iodide, relative to the carrier core of from about 5 percent by weight to about 30 percent by weight. The weight percent of the polymeric carrier coatings is calculated, for example, by subtracting the weight of the carrier core from the total weight of all of the components of the carrier and dividing the resulting value by the total weight of all of the components of the carrier, and multiplying the result by 100. For example, when the carrier comprises 95 grams of strontium ferrite core and 2.5 grams of a polymer of 20 percent CuI/80 percent polyurethane and 2.5 grams of a polymer of 19 percent carbon black/81 percent polymethylmethacrylate, the calculated percent polymers, or coating weight in the carrier is 5 percent. In another example, when the carrier comprises 75 grams of strontium ferrite core and 20 grams of a polymer of 80 percent CuI/20 percent polyurethane and 5 grams of a polymer of 19 percent carbon black/81 percent polymethylmethacrylate, the calculated percent polymer in the carrier is $\{((75+20+5)-75)/100\}*100=25$ percent. Of importance with respect to the present invention in embodiments is the coating weight, that is the total weight percent of polymer mixture, for example first and second polymer with copper iodide, of from about 5 to about 25, about 5.5 to about 24, or about 6 to about 20 percent, or weight percent, to enable a suitable carrier triboelectric charging value range, high triboelectric charging values for the carrier, and acceptable conductivities.

Developer compositions comprised of the carrier particles illustrated herein and prepared, for example, by a dry coating process are useful in electrostatographic or electrophotographic imaging systems, especially xerographic imaging and printing processes, and digital processes, reference the Xerox Corporation 220 and 230 machines, especially xerographic processes in which the magnetic brush is highly agitated by virtue of (1) the carrier particles possessing a permanent magnetic moment, and (2) the brush composed of these particles experiencing a rapidly varying magnetic field. These xerographic development systems can function either with the magnetic brush in contact with a second member of the development system, such as the photoreceptor, an intermediate donor roll, or with the magnetic brush out of contact with the second member, for example when a non-interactive development system is desired. Additionally, the invention developer compositions comprised of substantially conductive carrier particles are useful in imaging methods wherein relatively constant conductivity parameters are desired. Furthermore, in the aforementioned imaging processes the triboelectric charge on the carrier particles can be preselected depending on the polymer composition and dispersant component applied to the carrier core, the conductive component selected, the amount of cuprous iodide selected, and the coating weight. Also, in embodiments the carrier core can contain a first continuous polymer coating, such as polymethacrylate, or a thermosetting polymer, such as a polyester/polyurethane mixture, and dispersed therein conductive components, such as conductive carbon blacks or metal oxides, in amounts, for example, of from about 1 to about 70, and preferably from about 10 to about 60 weight percent, and a second polymer with cuprous iodide contained therein in an amount of, for example, from about 75 to about 95 weight percent.

PRIOR ART

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions is the appropriate triboelectric charging values associated therewith as it is these values that enable continued constant developed images of high quality and excellent resolution.

Additionally, carrier particles for use in the development of electrostatic latent images are described in many patents including, for example, U.S. Pat. No. 3,590,000. These carrier particles may consist of various cores, including steel, with a coating thereover of fluoropolymers, and terpolymers of styrene, methacrylate, and silane compounds. Past efforts have focused on the attainment of coatings for carrier particles for the purpose of improving development quality, and also to permit particles that can be recycled, and that do not adversely effect the imaging member in any substantial manner. A number of these coatings can deteriorate rapidly, especially when selected for a continuous xerographic process where the entire coating may separate from the carrier core in the form of chips or flakes; and fail upon impact, or abrasive contact with machine parts and other carrier particles. These flakes or chips, which cannot generally be reclaimed from the developer mixture, have an adverse effect on the triboelectric charging characteristics of the carrier particles thereby providing images with lower resolution in comparison to those compositions wherein the carrier coatings are retained on the surface of the core substrate. Further, another problem encountered with some prior art carrier coating resides in fluctuating triboelectric charging characteristics, particularly with changes in relative humidity. The aforementioned modification in triboelectric charging characteristics provides developed images of lower quality, and with background deposits.

There are illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there are disclosed in this patent coated carrier particles obtained by mixing carrier core particles of an average diameter of from between about 30 microns to about 1,000 microns with from about 0.05 percent to about 3.0 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes, enabling the thermoplastic resin particles to melt and fuse on the carrier core. While the developer and carrier particles prepared in accordance with the process of this patent are suitable for their intended purposes, the conductivity values of the resulting particles are not constant in all instances, for example, when a change in carrier coating weight is accomplished to achieve a modification of the triboelectric charging characteristics; and further with regard to the '387 patent, in many situations carrier and developer mixtures with only specific triboelectric charging values can be generated when certain conductivity values or characteristics are contemplated. With the invention of the present application, the conductivity of the resulting carrier particles can be substantially constant, and moreover, the triboelectric values can be selected to vary significantly, for example, from less than about −30 microcoulombs per gram to about +40 microcoulombs per gram.

There is illustrated in U.S. Pat. Nos. 4,937,166 and 4,935,326, the disclosures of which are totally incorporated herein by reference, carrier containing a mixture of polymers, such as two polymers, not in close proximity in the triboelectric series. Moreover, in U.S. Pat. No. 4,810,611, the disclosure of which is totally incorporated herein by reference, there is disclosed that there can be added to carrier coatings colorless conductive metal halides in an amount of from about 25 to about 75 weight percent, such halides including copper iodide, copper fluoride, and mixtures thereof. In the '611 patent, the conductivity ranges are considered relatively narrow, and the carrier tribo charge is not believed to be of a wide range, disadvantages overcome, or minimized with the present invention.

Carriers obtained by applying insulating resinous coatings to porous metallic carrier cores using solution coating techniques are undesirable from many viewpoints. For example, the coating material will usually reside in the pores of the carrier cores, rather than at the surfaces thereof; and, therefore, is not available for triboelectric charging when the coated carrier particles are mixed with finely divided toner particles. Attempts to resolve this problem by increasing the carrier coating weights, for example, to as much as 3 percent or greater to provide an effective triboelectric coating to the carrier particles necessarily involves handling excessive quantities of solvents, and further, usually these processes result in low product yields. Also, solution coated carrier particles, when combined and mixed with finely divided toner particles, provide in some instances triboelectric charging values which are too low for many uses. The powder coating processes of the present invention overcome these disadvantages, and further enable developers that are capable of generating high and useful triboelectric charging values with finely divided toner particles; and also wherein the carrier particles are of substantially constant conductivity. Further, when resin coated carrier particles are prepared by the powder coating process of the present invention, the majority of the coating materials are fused to the carrier surface thereby reducing the number of toner impaction sites on the carrier material. Additionally, there can be achieved with the process of the present invention and the carriers thereof, independent of one another, desirable triboelectric charging characteristics and conductivity values; that is for example, the triboelectric charging parameter is not dependent on the carrier coating weight as is believed to be the situation with the process of U.S. Pat. No. 4,233,387 wherein an increase in coating weight on the carrier particles may function to also permit an increase in the triboelectric charging characteristics. Specifically, therefore, with the carrier compositions and process of the present invention there can be formulated developers with selected triboelectric charging characteristics and/or conductivity values in a number of different combinations. Thus, for example, there can be formulated in accordance with the invention of the present application developers with conductivities of from about $10^{-6}$ ohm-cm to about $10^{-17}$ ohm-cm, about $10^{-10}$ ohm-cm to about $10^{-6}$, and preferably from about $10^{-8}$ ohm-cm to about $10^{-6}$ ohm-cm, determined in a magnetic brush conducting cell, and a wide carrier triboelectric charging value of from about −30 to about +40, and in embodiments of from about −25 to about +25 microcoulombs per gram on the carrier particles as determined as follows. A developer comprised of toner and carrier is placed on the bottom electrode of a two plane parallel non-magnetic electrodes with 1 cm of separation. The bottom electrode is connected to an electrometer and in close proximity to this electrode is a segmented magnetic donut. The magnet rotates in a plane parallel to the electrode and the developer will respond by allowing carrier to flip and move around the ring of the magnetic field. Applying a potential difference between the electrodes with the field in the proper direction will pull and attract the toner across the gap as it becomes free from the carrier. The integrated charge on the toner that is transported across the gap is measured by the electrometer. The mass of the toner is measured by weighing the upper plate. The triboelectric charging value is calculated by dividing the measured integrated charge on the toner by the measured mass of toner on the upper plate. Thus, the developers of the present invention can be formulated with constant conductivity values with different triboelectric charging characteristics by, for example, maintaining the same total coating weight on the carrier particles and changing the amount of cuprous iodide and conductive component ratio. Similarly, there can be formulated developer compositions wherein constant triboelectric charging values are achieved and the conductivities are altered by retaining the same total coating weight on the carrier particles.

Other U.S. Patents that may be of interest include U.S. Pat. No. 3,939,086, which illustrates steel carrier beads with polyethylene coatings, see column 6; U.S. Pat. No. 4,264,697, which discloses dry coating and fusing processes; U.S. Pat. Nos. 3,533,835; 3,658,500; 3,798,167; 3,918,968;

3,922,382; 4,238,558; 4,310,611; 4,397,935; and 4,434,220, the disclosures of each of these patents being totally incorporated herein by reference.

SUMMARY OF THE INVENTION

It is an object of the present invention to provide toner and developer compositions with conductive carrier particles containing a polymer coating mixture.

In another object of the present invention there are provided dry coating processes for generating carrier particles of substantially constant conductivity parameters.

In yet another object of the present invention there are provided dry coating processes for generating carrier particles of substantially constant conductivity parameters, and a wide range of preselected triboelectric charging values.

In yet a further object of the present invention there are provided carrier particles with a coating of a first polymer and dispersed in the polymer conductive particles, and a second polymer with cuprous iodide.

In embodiments of the present invention there are provided developer compositions comprised of toner particles, and carrier particles preferably prepared by a powder coating process, and wherein the carrier particles are comprised of a hard magnetic core, that is, a core which when exposed to a magnetic field acquires a magnetic moment which is retained by the core after the magnetic field is removed and with a certain coatings thereover. More specifically, the carrier particles selected can be prepared by mixing low density porous hard magnetic, or magnetically attractable metal core carrier particles of strontium ferrite with a first polymer, especially polymethacrylate, and which polymer has dispersed therein carbon black or a similar conductive component, and a second polymer containing copper iodide, especially cuprous iodide, in certain important amounts until adherence thereof to the carrier core by mechanical impaction or electrostatic attraction; heating the resulting mixture of carrier core particles and polymer to a temperature, for example, of between from about 200° F. to about 550° F. for an effective period of, for example, from about 10 minutes to about 60 minutes enabling the polymer to melt and fuse to the carrier core particles; cooling the coated carrier particles; and thereafter, classifying the obtained carrier particles to a desired particle size of, for example, from about 50 to about 200 microns in diameter, and wherein the carrier coating weight is preferably from about 5 to about 30, and preferably from about 5.5 to about 24 weight percent.

Embodiments of the present invention include a composition comprised of a hard strontium ferrite core, and more specifically, wherein the strontium ferrite is a mixture of strontium oxide (SrO) and ferrous oxide ($Fe_2O_3$), with the formula X SrO (1–X) $Fe_2O_3$, with X being from about 8 to about 15 percent by weight, and which oxide is obtained from FDK Corporation or PowderTech Corporation, and thereover a mixture of a first and second polymer, and wherein said first polymer contains a conductive component, and the second polymer contains copper iodide; a carrier composition wherein the copper iodide is cuprous iodide present in an amount of from about 75 to about 95 weight percent based on the amount of the second polymer and the iodide; a strontium ferrite carrier with two polymers thereover, and wherein the conductive component for the first polymer is a metal oxide, or preferably carbon black, wherein the conductive component for said first polymer is carbon black selected in an amount of from about 15 to about 50 weight percent; wherein the second polymer is a polyester, or a styrene based polymer, and the first polymer is polymethylmethacrylate, wherein the first polymer is selected in an amount of from about 1 to about 99 weight percent and the second polymer is selected in an amount of from about 99 to about 1 weight percent, and wherein the coating weight is as indicated herein.

Various suitable solid core carrier materials can be selected for the developers of the present invention. Characteristic core properties of importance include those that will enable the toner particles to acquire a positive charge or a negative charge, and carrier cores that will permit desirable flow properties in the developer reservoir present in the xerographic imaging apparatus. Also of value with regard to the carrier core properties are, for example, suitable magnetic characteristics that will permit magnetic brush formation in magnetic brush development processes; and also wherein the carrier cores possess desirable mechanical aging characteristics. The magnetic properties of suitable core materials, for example strontium ferrite cores, are characterized by the measurement of the magnetic moment, retentivity, and coercivity of the core. Values for these magnetic properties for suitable cores are, for example, in the range of from about 45 EMU per gram to about 55 EMU per gram for the magnetic moment, from about 25 EMU per gram to about 35 EMU per gram for the retentivity, and from about 1,000 Oersted to about 3,500 Oersted for the coercivity. Preferred carrier cores have an average particle size diameter of from between about 20 microns to about 200 microns.

Also included within the scope of the present invention is a composition comprised of a core and thereover a mixture of a first and second polymer, and wherein said first polymer contains a conductive component, and said second polymer contains copper iodide, and wherein the coating weight percent for said first and said second polymer is from about 5 to about 25; a composition wherein the copper iodide is cuprous iodide present in an amount of from about 75 to about 95 weight percent based on the amount of said second polymer and said iodide, said core is strontium ferrite, and there results carrier particles, and wherein said coating weight is from about 5.5 to about 24 percent; a composition wherein said conductive component for said first polymer is a metal oxide; a composition wherein said conductive component for said first polymer is carbon black; a composition wherein said conductive component for said first polymer is carbon black selected in an amount of from about 15 to about 60 weight percent; a composition wherein said first polymer is a polymethylmethacrylate, and said second polymer is a polyester, a styrene based polymer, or a polyurethane based polymer; a composition wherein said first polymer is selected in an amount of from about 1 to about 99 weight percent, and said second polymer is selected in an amount of from about 99 to about 1 weight percent; a composition wherein said coating weight is from about 5.5 to about 24 weight percent; a composition wherein said coating weight is from about 6 to about 20 weight percent; a process for the preparation of carrier which comprises (1) mixing carrier core with a mixture of a first and second polymer, and wherein said first polymer contains a conductive component, and said second polymer contains copper iodide; (2) dry mixing the resulting carrier core for a sufficient period of time enabling the polymers to adhere to the carrier core; (3) subsequently heating the mixture of carrier core particles and polymer to a temperature of from about 200° F. and about 550° F., whereby the polymers melt and fuse to the carrier core; and (4) thereafter cooling the resulting coated carrier particles, and wherein the carrier coating weight is from about 5 to about 25 weight percent;

a process wherein the copper iodide is present in an amount of from about 75 to about 95 weight percent, the core is strontium ferrite, the conductive component is a conductive carbon black, and wherein said coating weight is from about 5.5 to about 20 percent; a process wherein the carbon black is present in an amount of from about 15 to about 60 weight percent; a process wherein the carbon black is present in an amount of from about 15 to about 40 weight percent; a process wherein the conductive component is a conductive carbon black present in an amount of from about 15 to about 50 weight percent, the copper iodide is cuprous iodide present in an amount of from about 75 to about 90 weight percent, the carrier conductivity is from about $10^{-6}$ to about $10^{-15}$ (ohm-cm)$^{-1}$, and the carrier triboelectric charge is from about a minus 30 to about a positive 40 microcoulombs per gram; a process wherein the conductive component is a conductive carbon black present in an amount of from about 15 to about 25 weight percent, the carrier conductivity is from about $10^{-7}$ to about $10^{-8}$ (ohm-cm)$^{-1}$, and the carrier triboelectric charge is from about a minus 30 to about a positive 30 microcoulombs per gram; a process wherein the first polymer is polymethylmethacrylate, and the second polymer is a polyurethane; an improved process for the preparation of carrier particles with an extended triboelectric charging range and with an extended conductivity range, which process comprises mixing a strontium ferrite carrier core with a polymer mixture, and which mixture comprises a first and second polymer having dispersed therein, respectively, carbon black and copper iodide, followed by heating until the polymers fused to the core, and thereafter cooling, and wherein said iodide is present in an amount of from about 75 to about 95 weight percent, and wherein said coating weight for said first and said second polymer is from about 5 to about 25 percent; a process wherein said first polymer is polymethylmethacrylate, said second polymer is a polyurethane, and said iodide is cuprous iodide; a process with from about 6 to about 15 percent of carrier coating polymer mixture by weight and containing said conductive component present in an amount of from about 5 to about 60 weight percent, and which carrier possesses a conductivity of from about $1\times10^{-8}$ mho/centimeter to about $1\times10^{-15}$ mho/centimeter, and a triboelectric value of from about a minus 30 to plus 30 microcoulombs per gram; a carrier composition comprised of a core and thereover a first and second polymer, and wherein said first polymer contains a conductive component, and said second polymer contains copper iodide in an amount of from about 75 to about 95 weight percent, and wherein the coating weight for said first and second polymer is from about 5 to about 25 weight percent; a composition wherein the core is strontium ferrite, and said iodide coating weight, or amount is from about 6 to about 24 weight; a composition wherein the core is steel, iron, or a ferrite; a composition wherein said second polymer is a polyurethane; and a composition wherein said carrier triboelectric charge is from about a minus 30 to about a positive 45 microcoulombs per gram; a developer comprised of the composition of claim 1 and toner.

The first polymer coating preferably has dispersed therein conductive components, such as metal oxides like tin oxide, conductive carbon blacks, and the like, in effective amounts of, for example, from about 1 to about 70 and preferably from about 15 to about 60 weight percent. Specific examples of conductive components include the conductive carbon black SC Ultra manufactured by Conductex, Inc., and antimony-doped tin oxide Zelec ECP3005-XC manufactured by DuPont. Other conductive components may be selected, such as known conductive carbon blacks, and the like.

Of importance with respect to the present invention in addition to the coating weights, is the presence of cuprous iodide in at least one polymer coating, and more specifically, in a second polymer that contains no other conductive component, which iodide is preferably present in an amount of at least about 70 percent by weight, and more specifically, from about 75 to about 95 weight percent. With the combination of two polymers, conductive component and iodide containing component, there are enabled the advantages of the present invention, including the wide ranges of carrier tribo and carrier conductivity as indicated herein. For example, a polymer coating comprised of a combination of powders of (1) 19 percent by weight of Conductex SC Ultra conductive carbon black incorporated into poly (methylmethacrylate) polymer, and (2) 80 percent by weight of cuprous iodide incorporated into a thermosetting polyurethane/polyester polymer will provide carrier triboelectric values of from about −25 microcoulombs per gram to about +25 microcoulombs per gram depending on the relative ratios of the two polymers used, and conductivities greater than, or equal to about $5\times10^{-10}$ mhos per centimeter.

The process for incorporating the polymers onto a carrier core can be sequential, a process in which one of the two polymers is fused to the surface in a first step, and the second polymer is fused to the surface in a subsequent fusing step. Alternatively, the process for incorporation can comprise a single fusing step in which the two polymers, which are mixed with each other prior to the fusing process, are incorporated onto the core in a single fusing step.

Also, the carrier coating can have incorporated therein various charge enhancing additives, such as quaternary ammonium salts, and more specifically, distearyl dimethyl ammonium methyl sulfate (DDAMS), bis[1-[(3,5-disubstituted-2-hydroxyphenyl)azo]-3-(mono-substituted)-2-naphthalenolato(2-)] chromate(1-), ammonium sodium and hydrogen (TRH), cetyl pyridinium chloride (CPC), FANAL PINK® D4830, and the like, including those as specifically illustrated herein, and other effective known charge agents or additives. The charge additives are selected in various effective amounts, such as from about 0.05 to about 15 weight percent.

Examples of first and second polymers selected include polymethacrylate, polyvinylidenefluoride, polyvinylfluoride, polypentafluorostyrene, polyethylene, polymethylmethacrylate, copolyethylenevinylacetate, copolyvinylidenefluoride tetrafluoroethylene, and polyethylene; polymethylmethacrylate, polyurethane and copolyethylene, and preferably wherein the first and second polymers are dissimilar. Other known related polymers not specifically mentioned herein may also be selected, such as those illustrated in the U.S. Pat. Nos. 4,937,166 and 4,935,326 patents mentioned herein, and in U.S. Pat. No. 5,744,275, the disclosure of which is totally incorporated herein by reference in its entirety. Thermosetting polymers, such as polyurethanes, and the like may also be selected as the polymer coating, or layer.

Various effective suitable processes can be selected to apply the polymer, or mixture of polymer coatings to the surface of the carrier particles. Examples of typical processes for this purpose include combining the carrier core material, and the polymers with cuprous iodide and conductive component by cascade roll mixing, or tumbling, milling, shaking, electrostatic powder cloud spraying, fluidized bed, electrostatic disc processing, and an electrostatic curtain. Following application of the polymers, heating is initiated to permit flowout of the coating material over the surface of the carrier core. The concentration of the coating material powder particles, and the parameters of the heating step may be selected to enable the formation of a continuous film of the coating polymers on the surface of the carrier core, or permit only selected areas of the carrier core to be coated. When selected areas of the metal carrier core remain uncoated or exposed, the carrier particles will possess electrically conductive properties when the core material comprises a metal. The aforementioned conductivities can include various suitable values. Generally, however, this conductivity is from about $10^{-9}$ to about $10^{-17}$ mho-cm$^{-1}$ as measured, for example, across a 0.1 inch magnetic brush at an applied potential of 10 volts; and wherein the coating coverage encompasses from about 10 percent to about 100 percent of the carrier core.

Illustrative examples of toner binders, or resins selected for the toner, which when admixed with carrier generates developer compositions, includes a number of known thermoplastics, such as polyamides, epoxies, polyurethanes, diolefins, vinyl resins, polyesters, such as those obtained by the polymeric esterification products of a dicarboxylic acid and a diol comprising a diphenol. Specific vinyl monomers that can be used are styrene, p-chlorostyrene vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, vinyl ethers, inclusive of vinyl methyl ether, vinyl isobutyl ether, and vinyl ethyl ether; vinyl ketones inclusive of vinyl methyl ketone, vinyl hexyl ketone and methyl isopropenyl ketone; vinylidene halides such as vinylidene chloride, and vinylidene chlorofluoride; N-vinyl indole, N-vinyl pyrrolidene; styrene butadiene copolymers; mixtures thereof; and other similar known resins.

As one preferred toner resin there can be selected the esterification products of a dicarboxylic acid and a diol comprising a diphenol, reference U.S. Pat. No. 3,590,000, the disclosure of which is totally incorporated herein by reference. Other preferred toner resins include styrene/methacrylate copolymers; styrene/butadiene copolymers; polyester resins obtained from the reaction of bisphenol A and propylene oxide; and branched polyester resins resulting from the reaction of dimethyl terephthalate, 1,3-butanediol, 1,2-propanediol and pentaerythritol, reactive extruded polyesters, reference U.S. Pat. No. 5,376,494, the disclosure of which is totally incorporated herein by reference, and the like.

Generally, from about 1 part to about 5 parts by weight of toner particles are mixed with from about 10 to about 300 parts by weight of the carrier particles.

Numerous well known suitable colorants, such as pigments, dyes, mixtures thereof, mixtures of pigments, mixtures of dyes, and the like, and preferably pigments, can be selected as the colorant for the toner particles including, for example, carbon black, nigrosine dye, lamp black, iron oxides, magnetites, and mixtures thereof. The colorant, which is preferably carbon black, should be present in a sufficient amount to render the toner composition highly colored. Thus, the colorant is present in amounts of from about 1 percent by weight to about 20, and preferably from about 5 to about 12 percent by weight, based on the total weight of the toner composition, however, lesser or greater amounts of colorant may be selected.

When the colorant particles are comprised of magnetites, which are a mixture of iron oxides ($FeO.Fe_2O_3$) including those commercially available as MAPICO BLACK®, they are present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant, such as carbon black like REGAL 330®, is contained therein, about 90 percent by weight of resin material is selected. Generally, however, the toner composition is comprised of from about 85 percent to about 97 percent by weight of toner binder, or toner resin particles, and from about 3 percent by weight to about 15 percent by weight of pigment particles such as carbon black.

Also, there may be selected toner compositions comprised of toner resin particles, carrier particles and as pigments or colorants, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, permanent yellow FGL, and the like. These pigments are generally present in the toner composition in an amount of from about 1 weight percent to about 15 weight percent based on the weight of the toner resin particles.

For further enhancing the positive charging characteristics of the developer compositions described herein, and as optional components there can be incorporated therein with respect to the toner charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate; U.S. Pat. No. 4,560,635, the disclosure of which is totally incorporated herein by reference; and other similar known charge enhancing additives. These additives are usually incorporated into the toner in an amount of from about 0.1 percent by weight to about 20 percent by weight. These charge additives can also be dispersed in the carrier polymer coating as indicated herein.

The toner composition of the present invention can be prepared by a number of known methods including melt blending the toner resin particles, and pigment particles or colorants of the present invention followed by mechanical attrition, emulsion/aggregation, and the like. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product.

The toner and developer compositions may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules there can be selected the aryl diamines disclosed in the '990 patent. Also, there can be selected as photogenerating pigments, squaraine compounds, titanyl phthalocyanines, hydroxygallium phthalocyanines, thiapyrilliums, and the like. These layered members are conventionally charged negatively thus requiring a positively charged toner.

Images obtained with this developer composition had acceptable solids, excellent halftones, and desirable line resolution with acceptable or substantially no background deposits.

The following Examples are being provided to further illustrate the present invention, it being noted that these Examples are intended to illustrate and not limit the scope of the present invention. Parts and percentages are by weight unless otherwise indicated.

EXAMPLE I 1,091 Grams of copper iodide (obtained from Shepard Chemicals) and 273 grams of polyurethane polymer (Envirocron by PPG Industries, Inc.) were combined and processed in an extruder (APV) with the following process parameters: 260° F. barrel temperature, 255° F. die head temperature, 41 percent load, a feed rate of 7.9 grams per minute, and a tool speed of 150 rotations per minute. The resulting extrudate comprised of 80 percent copper iodide by weight dispersed uniformly in the Envirocron resin was size reduced by mechanical attrition in a 100 AFG fluid energy mill with the following process parameters: grinding pressure of 100 pounds per square inch, and a feed rate of 200 grams per minute. The resulting polymer composite was comprised of 80 percent by weight of copper iodide and 20 percent by weight of polyurethane polymer and had a volume median particle size after mechanical attrition of 3.4 microns.

The carrier coating process comprised five separate coating process steps. In the first step of the five step carrier coating process, 32.66 grams of a 20 weight percent Conductex SC Ultra conductive carbon black-loaded poly (methylmethacrylate) with a volume median particle size of 2 microns produced in a chemical process prior to mixing and 8.16 grams of the above prepared copper iodide-loaded Envirocron were mixed for two minutes by hand to produce the pre-polymer mix. 2,041 Grams of 75 micron porous strontium ferrite (PowderTech Corporation) with a magnetic moment of 49.9 EMU per gram, a retentivity of 27.9 EMU per gram, and a coercivity of 1,640 Oersted was mixed with 40.82 grams of the above prepared pre-polymer mix. The mixing was accomplished in a V-Cone blender with the following process conditions: blender speed of 23.5 rotations per minute and a blend time of 45 minutes. There resulted uniformly distributed and electrostatically attached polymer on the core as determined by visual observation. Thereafter, the resulting carrier particles were inserted into a rotating tube furnace for a period of 30 minutes. This furnace was maintained at a temperature of 400° F. thereby causing the polymers to melt and fuse to the core. The product from the first step was screened through an 84 TBC mesh screen to remove any large agglomerates.

The second step of the five step carrier coating process comprised mixing 1,750 grams of the output of the above first step with 35 grams of pre-polymer mix that was prepared by hand mixing for about 2 minutes 28 grams of the carbon black-loaded poly(methylmethacrylate) and 7 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the first step as determined by visual observation. The resulting mixture was then placed in a rotating kiln furnace for 30 minutes to reach a peak temperature of 400° F. thereby causing the polymers to melt and fuse to the powder from the first step. The product from the second step was then screened through an 84 TBC mesh screen to remove any large agglomerates.

The third step of the five step carrier coating process comprised mixing 1,400 grams of the output of the above second step with 7 grams of pre-polymer that was prepared by hand mixing (for about 2 minutes throughout) 5.6 grams of the carbon black-loaded poly(methylmethacrylate) and 1.4 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the second step as determined by visual observation. The resulting mixture was then placed in a rotating kiln furnace for 30 minutes to reach a peak temperature of 400° F. thereby causing the polymers to melt and fuse to the powder from the second step. The product from the third step was then screened through an 84 TBC mesh screen to remove any large agglomerates.

The fourth step of the five step carrier coating process comprised mixing 1,100 grams of the output of the above third step with 11 grams of pre-polymer that was prepared by hand mixing 8.8 grams of the carbon black-loaded poly(methylmethacrylate) and 2.2 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the third step as determined by visual observation. The resulting mixture was then placed in a rotating kiln furnace for 30 minutes to reach a peak temperature of 400° F. thereby causing the polymers to melt and fuse to the powder from the third step. The product from the fourth fusing was then screened through an 84 TBC mesh screen to remove any large agglomerates.

The fifth step of the five step carrier coating process comprised mixing 1,000 grams of the output of the above fourth step with 10 grams of pre-polymer that was prepared by hand mixing 8 grams of the carbon black-loaded loaded poly(methylmethacrylate) and 2 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the fourth step as determined by visual observation. The resulting mixture was then placed in a rotating kiln furnace for 30 minutes to reach a peak temperature of 400° F. thereby causing the polymers to melt and fuse to the powder from the fourth step. The product from the fifth step was then screened through an 84 TBC mesh screen to remove any large agglomerates. The final product was comprised of a carrier core with a total of 6.5 percent polymer mixture by weight (coating weight) on the surface with the polymers being a combination of 80 percent by weight of the carbon black loaded poly(methylmethacrylate), and which polymethylmethacrylate contained 19 percent by weight of carbon black, and 20 percent by weight of the copper iodide-loaded Envirocron, and which Envirocron contained 80 percent by weight of copper iodide.

A developer composition was then prepared by mixing 200 grams of the above prepared carrier with 10 grams of a toner composition comprised of 75.73 percent of Resapol HT resin (uncrosslinked bisphenol-A propylene oxide fumarate polymer), 17.67 percent REX02 by weight (bisphenol-A propylene oxide fumarate polymer with 33 to 40 percent gel), 6.6 percent Sun Blue flushed by weight and 0.3 percent by weight of a surface-treated silica with an 8 nanometer particle size (TS-530 from Cabosil Corp., with a surface treatment of hexamethyldisilazane) injected during grind.

Thereafter, the triboelectric charge on the carrier particles was determined by the known Faraday Cage process, and there was measured on the carrier a charge of +21.5 microcoulombs per gram. Further, the conductivity of the carrier as determined by the known Balsbaugh cell process by imposing a 50 volt potential between the plates was $2.47 \times 10^{-9}$ mho-cm$^{-1}$. Therefore, these carrier particles were conducting.

In all the Examples, the triboelectric charging values and the conductivity numbers were obtained in accordance with the aforementioned procedure.

EXAMPLE II

40 Pounds of copper iodide (obtained from Shepard Chemicals) and 10 pounds of polyurethane polymer (Envirocron by PPG Industries, Inc.) were combined and processed in an extruder (ZDSK-28) with the following process parameters: 257 to 284° F. barrel temperatures, 275° F. die head temperature, 281° F. melt temperature, a feed rate of 34.0 grams per minute, and a screw speed of 356 rotations per minute. The resulting extrudate comprised of 80 percent copper iodide by weight dispersed uniformly in the Envirocron resin was size reduced by mechanical attrition in a 15" Sturtevant fluid energy mill with the following process parameters: feed pressure of 120 pounds per square inch, grinding pressure of 120 pounds per square inch, and flood feeding. The resulting polymer composite was comprised of 80 percent by weight of copper iodide and 20 percent by weight of polyurethane polymer and had a volume median particle size after mechanical attrition of 4.8 microns.

In the first step of the two step carrier coating process, 96 grams of a carbon black-loaded poly(methylmethacrylate) with about 20 weight percent of Conductex SC Ultra conductive carbon black produced with a volume median particle size of 2 microns in a chemical process prior to mixing and 24 grams of the above prepared copper iodide-loaded Envirocron were mixed by hand to produce the pre-polymer mix. 1,500 Grams of 50 micron porous strontium ferrite (PowderTech Corporation)) with a magnetic moment of 49.9 EMU per gram, a retentivity of 28.3 EMU per gram, and a coercivity of 1640 Oersted, was mixed with 120 grams of above prepared pre-polymer mix. The mixing was accomplished in a V-Cone blender with the following process conditions: blender speed of 23.5 rotations per minute and a blend time of 60 minutes. There resulted uniformly distributed and electrostatically attached polymer on the core as determined by visual observation. Thereafter, the resulting carrier particles were inserted into a rotating tube furnace for a period of 30 minutes. This furnace was maintained at a temperature of 450° F. thereby causing the polymers to melt and fuse to the core. The product from the first step was screened through an 84 TBC mesh screen to remove any large agglomerates.

The second step of the two step carrier coating process comprised mixing the 750 grams of the output of the above first step with 60 grams of pre-polymer mix that was prepared by hand mixing 48 grams of the carbon black-loaded poly(methylmethacrylate) and 12 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the first step as determined by visual observation. The resulting mixture was then placed in a rotating kiln furnace for 30 minutes to reach a peak temperature of 450° F. thereby causing the polymers to melt and fuse to the powder from the first step. The product from the second step was then screened through a 84 TBC mesh screen to remove any large agglomerates. The final product was comprised of a carrier core with a total of 16 percent polymer mixture by weight, or 16 weight percent coating weight, on the surface with the polymers mixture being a combination of 80 percent by weight of the carbon black loaded poly (methylmethacrylate) and which polymethylmethacrylate contained 19 percent by weight carbon black, and 20 percent by weight of the copper iodide-loaded Envirocron, and which Envirocron contained 80 percent by weight of copper iodide.

A developer composition was then prepared by mixing 200 grams of the above prepared carrier with 10 grams of a toner composition comprised of 75.73 percent of Resapol HT resin (uncrosslinked bisphenol A propylene oxide fumarate polymer), 17.67 percent of REX02 by weight (bisphenol A propylene oxide fumarate polymer with 33 to 40 percent gel), 6.6 percent of Sun Blue flushed by weight and 0.3 percent by weight of a surface-treated silica with an 8 nanometer particle size (TS-530 from Cabosil Corporation, with a surface treatment of hexamethyidisilazane) injected during grind.

Thereafter, the triboelectric charge on the carrier particles was determined by the known Faraday Cage process, and there was measured on the carrier a charge of +14.9 microcoulombs per gram. Further, the conductivity of the carrier as determined by the known Balsbaugh cell process by imposing a 50 volt potential between the plates was $2.83 \times 10^{-7}$ mho-cm$^{-1}$. Therefore, these carrier particles were conducting.

EXAMPLE III

In the first step of the three step carrier coating process, 640 grams of the copper iodide doped Envirocron material mentioned in Example I and 160 grams of a carbon black-loaded poly(methylmethacrylate) with about 20 weight percent of Conductex SC Ultra conductive carbon black produced with a volume median particle size of 2 microns in a chemical process were mixed with 10,000 grams of 50 micron porous strontium ferrite (PowderTech Corporation) from Example IV. The mixing was accomplished by seven equal batches in a Munson M5R Minimixer with the following process conditions: blender speed of 50 rotations per minute and a blend time of 30 minutes. There resulted uniformly distributed and electrostatically attached polymer on the core as determined by visual observation. Thereafter, the resulting carrier particles were inserted into a rotating tube furnace for a period of 30 minutes. This furnace was maintained at a temperature of 450° F. thereby causing the polymers to melt and fuse to the core. The product from the first step was screened through an 84 TBC mesh screen to remove any large agglomerates.

The second step of the three step carrier coating process comprised mixing 8,200 grams of the output of the above first step with 525 grams of the copper iodide-loaded Envirocron and 131 grams of carbon black-loaded poly (methylmethacrylate). This mixing was accomplished by five batches in a Munson M5R Minimixer with the following process conditions: blender speed of 50 rotations per minute and a blend time of 20 minutes. There resulted uniformly distributed and electrostatically attached polymer on the powder from the first step as determined by visual observation. The resulting mixture was then placed in a rotating kiln furnace for 30 minutes to reach a peak temperature of 450° F. thereby causing the polymers to melt and fuse to the powder from the first step. The product from the second step was then screened through an 84 TBC mesh screen to remove any large agglomerates.

The third step of the three step carrier coating process comprised mixing 5,000 grams of the output of the above second step with 320 grams of copper iodide-loaded Envirocron and 80 grams of carbon black-loaded poly (methylmethacrylate). This mixing was accomplished by three batches in a Munson M5R Minimixer with the following process conditions: blender speed of 50 rotations per minute and a blend time of 20 minutes. There resulted uniformly distributed and electrostatically attached polymer on the powder from the second step as determined by visual observation. The resulting mixture was then placed in a rotating kiln furnace for 30 minutes to reach a peak temperature of 450° F. thereby causing the polymers to melt and fuse to the powder from the second step. The product from the third step was then screened through an 84 TBC mesh screen to remove any large agglomerates. The final product was comprised of a carrier core with a total of 18 percent polymers by weight, or coating weight, on the surface, the polymers being a combination of 20 percent by weight of the carbon black loaded poly(methylmethacrylate), and which polymethylmethacrylate contained 19 percent by weight of carbon black, and 80 percent by weight of the copper iodide-loaded Envirocron, and which Envirocron contained 80 percent by weight of copper iodide.

A developer composition was then prepared by mixing 200 grams of the above prepared carrier with 10 grams of a toner composition comprised of 75.73 percent of Resapol HT resin (uncrosslinked bisphenol A propylene oxide fumarate polymer), 17.67 percent of REX02 by weight (bisphenol A propylene oxide fumarate polymer with 33 to 40 percent gel), 6.6 percent of Sun Blue flushed by weight, and 0.3 percent by weight of a surface-treated silica with an 8 nanometer particle size (TS-530 from Cabosil Corporation, with a surface treatment of hexamethyldisilazane) injected during grind.

Thereafter, the triboelectric charge on the carrier particles was determined by the known Faraday Cage process, and there was measured on the carrier a charge of −22.6 microcoulombs per gram. Further, the conductivity of the carrier as determined by the known Balsbaugh cell process by imposing a 50 volt potential between the plates was $2.08 \times 10^{-8}$ mho-cm$^{-1}$. Therefore, these carrier particles were conducting.

EXAMPLE IV

In the first step of the four step carrier coating process, 80 grams of a carbon black-loaded poly(methylmethacrylate) with about 20 weight percent of Conductex SC Ultra conductive carbon black produced with a volume median particle size of 2 microns in a chemical process prior to mixing and 20 grams of the above mentioned copper iodide-loaded Envirocron in Example I were mixed by hand to produce the pre-polymer mix. 1,000 Grams of 30 micron porous strontium ferrite (FDK America) with a magnetic moment of 49.7 EMU per gram, a retentivity of 31.8 EMU per gram, and a coercivity of 2,920 Oersted were mixed with 100 grams of the above prepared prepolymer mix. The mixing was accomplished in a V-Cone blender with the following process conditions: blender speed of 23.5 rotations per minute and a blend time of 45 minutes. There resulted uniformly distributed and electrostatically attached polymer on the core as determined by visual observation. Thereafter, the resulting carrier particles were inserted into a rotating tube furnace for a period of 30 minutes. This furnace was maintained at a temperature of 400° F. thereby causing the polymers to melt and fuse to the core. The product from the first step was screened through an 84 TBC mesh screen to remove any large agglomerates.

The second step of the four step carrier coating process comprised mixing 850 grams of the output of the above first step with 85 grams of pre-polymer mix that was prepared by hand mixing 68 grams of the carbon black-loaded poly (methylmethacrylate) and 17 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the first step as determined by visual observation. The resulting mixture was then placed in a rotating kiln furnace for 30 minutes to reach a peak temperature of 400° F. thereby causing the polymers to melt and fuse to the powder from the first step. The product from the second step was then screened through an 84 TBC mesh screen to remove any large agglomerates.

The third step of the four step carrier coating process comprised mixing 650 grams of the output of the above second step with 13 grams of pre-polymer that were prepared by hand mixing 10.4 grams of the carbon black-loaded poly(methylmethacrylate) and 2.6 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the second step as determined by visual observation. The resulting mixture was then placed in a rotating kiln furnace for 30 minutes to reach a peak temperature of 400° F. thereby causing the polymers to melt and fuse to the powder from the second step. The product from the third step was then screened through an 84 TBC mesh screen to remove any large agglomerates.

The fourth step of the four step carrier coating process comprised mixing 550 grams of the output of the above third step with 11 grams of pre-polymer that was prepared by hand mixing 8.8 grams of the carbon black-loaded poly (methylmethacrylate) and 2.2 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the third step as determined by visual observation. The resulting mixture was then placed in a rotating kiln furnace for 30 minutes to reach a peak temperature of 400° F. thereby causing the polymers to melt and fuse to the powder from the third step. The product from the fourth fusing was then screened through an 84 TBC mesh screen to remove any large agglomerates. The final product was comprised of a carrier core with a total of 24 percent polymers mixture by weight on the surface with the polymers being a combination of 80 percent by weight of the carbon black loaded poly(methylmethacrylate), and which polymethylmethacrylate contained 19 percent by weight of carbon black, and 20 percent by weight of the copper iodide-loaded Envirocron, and which Envirocron contained 80 percent by weight of copper iodide.

A developer composition was then prepared by mixing 200 grams of the above prepared carrier with 10 grams of a toner composition comprised of 75.73 percent of Resapol HT resin (uncrosslinked bisphenol A propylene oxide fumarate polymer), 17.67 percent of REX02 by weight (bisphenol A propylene oxide fumarate polymer with 33 to 40 percent gel), 6.6 percent of Sun Blue flushed by weight, and 0.3 percent by weight of a surface-treated silica with an 8 nanometer particle size (TS-530 from Cabosil Corporation, with a surface treatment of hexamethyldisilazane) injected during grind.

Thereafter, the conductivity of the carrier as determined by the known Balsbaugh cell process by imposing a 50 volt potential between the plates was $1.04 \times 10^{-9}$ mho-cm$^{-1}$. Therefore, these carrier particles were conducting.

EXAMPLE V

In the first step of the two step carrier coating process, 24 grams of a carbon black-loaded poly(methylmethacrylate) with about 20 weight percent of Conductex SC Ultra conductive carbon black produced with a volume median particle size of 2 microns in a chemical process prior to mixing and 6 grams of the above mentioned copper iodide-loaded Envirocron in Example I were mixed by hand to produce the pre-polymer mix. 1,000 Grams of 100 micron porous strontium ferrite (FDK America) with a magnetic moment of 49.4 EMU per gram, a retentivity of 29.9 EMU per gram, and a coercivity of 1,820 Oersted were mixed with 30 grams of the above prepared prepolymer mix. The mixing was accomplished in a V-Cone blender with the following process conditions: blender speed of 23.5 rotations per minute and a blend time of 45 minutes. There resulted uniformly distributed and electrostatically attached polymer on the core as determined by visual observation. Thereafter, the resulting carrier particles were inserted into a rotating tube furnace for a period of 30 minutes. This furnace was maintained at a temperature of 400° F. thereby causing the polymers to melt and fuse to the core. The product from the first step was screened through an 84 TBC mesh screen to remove any large agglomerates.

The second step of the two step carrier coating process comprised mixing 800 grams of the output of the above first step with 25 grams of prepolymer mix that was prepared by hand mixing 19.2 grams of the carbon black-loaded poly (methylmethacrylate) and 4.8 grams of the copper iodide-loaded Envirocron. This mixing was accomplished in a V-Cone blender with the following process conditions: blender speed of 23.5 rotations per minute and a blend time of 45 minutes. There resulted uniformly distributed and electrostatically attached polymer on the powder from the first step as determined by visual observation. The resulting mixture was then placed in a rotating kiln furnace for 30 minutes to reach a peak temperature of 400° F. thereby causing the polymers to melt and fuse to the powder from the first step. The product from the second step was then screened through an 84 TBC mesh screen to remove any large agglomerates. The final product was comprised of a carrier core with a total of 6 percent polymers mixture by weight on the surface with the polymers being a combination of 80 percent by weight of the carbon black loaded poly(methylmethacrylate), and which polymethylmethacrylate contained 19 percent by weight of carbon black, and 20 percent by weight of the copper iodide-loaded Envirocron, and which Envirocron contained 80 percent by weight of copper iodide.

A developer composition was then prepared by mixing 200 grams of the above prepared carrier with 10 grams of a toner composition comprised of 75.73 percent of Resapol HT resin (uncrosslinked bisphenol-A propylene oxide fumarate polymer), 17.67 percent of REX02 by weight (bisphenol A propylene oxide fumarate polymer with 33 to 40 percent gel), 6.6 percent of Sun Blue flushed by weight, and 0.3 percent by weight of a surface-treated silica with an 8 nanometer particle size (TS-530 from Cabosil Corporation, with a surface treatment of hexamethyldisilazane) injected during grind.

Thereafter, the conductivity of the carrier as determined by the known Balsbaugh cell process by imposing a 50 volt potential between the plates was $7.66 \times 10^{-9}$ mho-cm$^{-1}$. Therefore, these carrier particles were conducting.

Coating weights of polymer or polymers, especially polymer mixtures of a first and second polymer on the carrier core in excess of about 5 percent by weight, are of importance with respect to the present invention to enable, for example, conductive carrier properties with substantially insulative strontium ferrite cores. For example, using a 75 micron porous strontium ferrite core, carriers 1 to 5, obtained from PowderTech Corporation, the conductivity of a carrier coated with various percentages of polymer comprised of a mixture of 20 percent by weight of a polyurethane/80 percent CuI composite, and 80 percent by weight of a polymethylmethacrylate/19 percent carbon black composite is shown in the Table below as a function of the total polymer coating weight. At polymer coating weights below 4.5 percent by weight, the coating is substantially insulative. The carrier becomes semiconductive at 5.5 percent polymer coating on the carrier, with a measured conductivity of $4.9 \times 10^{-12}$ mho/cm, and fully conductive with a conductivity of $2.5 \times 10^{-9}$ mho/cm at a polymer coating weight of 6.5 weight percent. The triboelectric value, in the situation where the intrinsic triboelectric value of the polymer mixture is substantially different from the intrinsic triboelectric value of the carrier core, is expected to change substantially with increased polymer coating weight above 5 weight percent from the undesirable value of the core to the desired value of the polymer.

| Carrier No. | Total Coating Weight | Carrier Conductivity (mho/cm) |
|---|---|---|
| 1 | 2.00 | $5.9 \times 10^{-14}$ |
| 2 | 4.00 | $3.7 \times 10^{-14}$ |
| 3 | 4.50 | $4.0 \times 10^{-13}$ |
| 4 | 5.50 | $4.9 \times 10^{-12}$ |
| 5 | 6.50 | $2.5 \times 10^{-09}$ |

Other embodiments and modifications of the present invention may occur to those of ordinary skill in the art subsequent to a review of the present application and the information presented herein; these embodiments and modifications, as well as equivalents thereof, are also included within the scope of the present invention.

What is claimed is:

1. A composition comprised of a core and thereover a mixture of a first and second polymer, and wherein said first polymer contains a conductive component, and said second polymer contains copper iodide, and wherein the coating weight percent for said first and said second polymer is from about 5 to about 25.

2. A composition in accordance with claim 1 wherein the copper iodide is cuprous iodide present in an amount of from about 75 to about 95 weight percent based on the amount of said second polymer and said iodide, said core is strontium ferrite, and wherein said coating weight is from about 5.5 to about 24 percent.

3. A composition in accordance with claim 2 wherein said conductive component for said first polymer is a metal oxide.

4. A composition in accordance with claim 2 wherein said conductive component for said first polymer is carbon black.

5. A composition in accordance with claim 2 wherein said conductive component for said first polymer is carbon black selected in an amount of from about 15 to about 60 weight percent.

6. A composition in accordance with claim 2 wherein said first polymer is a polymethylmethacrylate, and said second polymer is a polyester, a styrene polymer, or a polyurethane polymer.

7. A composition in accordance with claim 2 wherein said first polymer is selected in an amount of from about 1 to about 99 weight percent, and said second polymer is selected in an amount of from about 99 to about 1 weight percent, and wherein the total coating weight for said first and said second polymer is about 100 weight percent.

8. A composition in accordance with claim 1 wherein said coating weight is from about 5.5 to about 24 weight percent.

9. A composition in accordance with claim 1 wherein said coating weight is from about 6 to about 20 weight percent.

10. A carrier composition comprised of a core and thereover a first and second polymer, and wherein said first polymer contains a conductive component, and said second polymer contains copper iodide in an amount of from about 75 to about 95 weight percent, and wherein the total coating weight for said first and second polymer is from about 5 to about 25 weight percent.

11. A composition in accordance with claim 10 wherein the core is strontium ferrite, and said iodide coating weight, or amount is from about 6 to about 24 weight percent.

12. A composition in accordance with claim 1 wherein the core is steel, iron, or a ferrite.

13. A composition in accordance with claim 2 wherein said second polymer is a polyurethane.

14. A composition in accordance with claim 2 wherein said carrier triboelectric charge is from about a minus 30 to about a positive 45 microcoulombs per gram.

15. A developer comprised of the composition of claim 1 and toner.

16. A composition in accordance with claim 1 wherein said core is a strontium ferrite.

17. A composition in accordance with claim 1 wherein said core is a strontium ferrite comprised of a mixture of strontium oxide and ferrous oxide of the formula X SrO $(1-X)$ Fe$_2$O$_3$, wherein X is from about 8 to about 15 weight percent.

18. A composition in accordance with claim 1 wherein said coating weight is from about 5.5 to about 24 weight percent.

19. A composition in accordance with claim 1 wherein said copper iodide is cuprous iodide, and wherein said cuprous iodide is present in an amount of from about 75 to about 95 weight percent based on the amount of said second polymer and said iodide.

20. A carrier consisting essentially of a core and thereover a mixture of a first and second polymer, and wherein said first polymer contains a conductive component, and said second polymer contains copper iodide, and wherein the total coating weight percent for said first and said second polymer is from about 5 to about 25.

21. A carrier in accordance with claim 20 with a conductivity of from about $10^{-10}$ to about $10^{-7}$ ohm/cm.

* * * * *